United States Patent [19]

Nakayama et al.

[11] Patent Number: 5,410,483
[45] Date of Patent: Apr. 25, 1995

[54] SHOCK ABSORBER CONTROL APPARATUS

[75] Inventors: Tadaki Nakayama, Chiryu; Hiromi Tokuda, Nagoya; Masayoshi Takeda, Oobu; Kouji Watanabe, Yokkaichi; Hiroshi Ishikawa, Nagoya, all of Japan

[73] Assignee: Nippondenso Co., Ltd., Kariya, Japan

[21] Appl. No.: 63,783

[22] Filed: May 19, 1993

[30] Foreign Application Priority Data

| | | | |
|---|---|---|---|
| May 20, 1992 | [JP] | Japan | 4-127429 |
| Jul. 31, 1992 | [JP] | Japan | 4-205372 |
| Sep. 25, 1992 | [JP] | Japan | 4-256937 |
| Apr. 5, 1993 | [JP] | Japan | 5-078010 |

[51] Int. Cl.⁶ .................. B60G 17/00; B60G 11/26
[52] U.S. Cl. .............. 364/424.05; 364/424.03; 280/707
[58] Field of Search ............ 364/424.05, 424.03; 280/707, 709; 180/41

[56] References Cited

U.S. PATENT DOCUMENTS

| | | | |
|---|---|---|---|
| 3,807,678 | 4/1974 | Karnopp et al. | 244/22 |
| 4,401,310 | 8/1983 | Ishikawa et al. | 280/6.1 |
| 5,072,965 | 12/1991 | Wada et al. | 280/707 |
| 5,088,760 | 2/1992 | Kakizaki et al. | 280/707 |
| 5,189,614 | 2/1993 | Mitsuoka et al. | 364/424.05 |
| 5,203,584 | 4/1993 | Butsuen et al. | 280/707 |
| 5,269,557 | 12/1993 | Butsuen et al. | 364/424.05 |
| 5,289,380 | 2/1994 | Kimura | 364/424.05 |

FOREIGN PATENT DOCUMENTS

| | | |
|---|---|---|
| 61-67009 | 5/1986 | Japan . |
| 274411 | 3/1990 | Japan . |
| 3104726 | 5/1991 | Japan . |

*Primary Examiner*—Kevin J. Teska
*Assistant Examiner*—Tan Nguyen
*Attorney, Agent, or Firm*—Cushman, Darby & Cushman

[57] ABSTRACT

A shock absorber is connected between a vehicle body and a vehicle wheel. The shock absorber provides a variable damping force. A control apparatus for the shock absorber includes an actuator for adjusting the damping force provided by the shock absorber. A vibration detecting device serves to detect a relative vibration between a spring upper member and a spring lower member. A damping-factor estimating device serves to estimate a damping factor of the shock absorber. A speed estimating device serves to estimate an absolute speed of the spring upper member on the basis of the relative vibration detected by the vibration detecting device and the damping force estimated by the damping-force estimating device. A signal setting device serves to set a drive signal of the actuator on the basis of the absolute spring upper member speed estimated by the speed estimating device.

17 Claims, 9 Drawing Sheets

SHOCK ABSORBER CONTROL APPARATUS

BACKGROUND OF THE INVENTION

1. Field of the Invention

This invention relates to a shock absorber control apparatus. This invention relates to, for example, an apparatus for controlling a damping force provided by a shock absorber in a vehicle.

2. Description of the Prior Art

Japanese published unexamined patent application 3-104726 discloses a damping-force control apparatus using the sky-hook theory which is designed so that a damping force provided by a shock absorber is controlled in response to a speed of the top of a spring and a relative speed between the top and the bottom of the spring. Specifically, in the control apparatus of Japanese patent application 3-104726, the damping force is discontinuously changed between two different levels in response to the relation between the sign of the speed of the top of the spring and the sign of the relative speed between the top and the bottom of the spring. Such a control apparatus tends to be complicated since a plurality of sensors are provided to detect a speed of the top of a spring and a relative speed between the top and the bottom of the spring.

There has been a prior-art proposed method of estimating a speed of the top of a spring from a relative displacement or movement between the top and the bottom of the spring. The estimation of the speed of the top of the spring enables the omission of a related sensor from a control apparatus, allowing simplification thereof.

The prior-art proposed method will now be described further. Regarding a system including a suspension having a combination of a spring and a shock absorber designed to provide a variable damping force, an equation of motion of the system which has one degree of freedom is given as:

$$M \cdot DDX + c \cdot DY + k \cdot Y = 0 \tag{1}$$

where "M" denotes the spring upper member weight (the weight of a member supported on the upper end or the top of the spring); DDX denotes the absolute acceleration of the spring upper member which equals the absolute acceleration of the top of the spring; "c" denotes the damping factor or coefficient of the shock absorber; DY denotes the relative speed between the spring upper member and a spring lower member (a member supported on the lower end or the bottom of the spring) which equals the relative speed between the top and the bottom of the spring; "k" denotes the spring modulus of the spring; and "Y" denotes the relative displacement between the spring upper member and the spring lower member which equals the relative displacement between the top and the bottom of the spring.

According to the sky-hook theory, an equation of motion of the system having one degree of freedom is given as:

$$M \cdot DDX + C \cdot DX + k \cdot Y = 0 \tag{2}$$

where "C" denotes the sky-hook damping factor or coefficient, and DX denotes the absolute speed of the spring upper member which equals the absolute speed of the top of the spring. In the prior-art proposed method, the sky-hook damping factor "C" is regarded as a constant, and the term c·DY is considered to be equal to the term C·DX when DX·DY>0. The equation (2) is subjected to Laplace transform, and consequently an estimated value DXp of the absolute speed of the spring upper member is given as:

$$DXp = (-k \cdot Y/M)/(S + C/M) \tag{3}$$

where "S" denotes the Laplace operator.

The following facts were experimentally found. The damping factor "c" of the shock absorber has a nonlinear relation with the relative speed DY between the spring upper member and the spring lower member. Thus, even if the sky-hook damping factor "C" is equal to a constant, the term c·DY is not always equal to the term C·DX under conditions where DX·DY>0. Therefore, in the prior-art proposed method, the estimated value DXp of the absolute speed of the spring upper member tends to be low in accuracy and reliability under certain conditions.

SUMMARY OF THE INVENTION

It is an object of this invention to provide an improved shock absorber control apparatus.

A first aspect of this invention provides a control apparatus for a shock absorber connected between a vehicle body and a vehicle wheel, the shock absorber providing a variable damping force, the apparatus comprising an actuator for adjusting the damping force provided by the shock absorber; vibration detecting means for detecting a relative vibration between a spring upper member and a spring lower member; damping-factor estimating means for estimating a damping factor of the shock absorber; speed estimating means for estimating an absolute speed of the spring upper member on the basis of the relative vibration detected by the vibration detecting means and the damping force estimated by the damping-force estimating means; and signal setting means for setting a drive signal of the actuator on the basis of the absolute spring upper member speed estimated by the speed estimating means.

A second aspect of this invention provides a control apparatus for a suspension having a combination of a shock absorber and a spring connected between a spring upper member and a spring lower member, the shock absorber providing a variable damping force, the apparatus comprising an actuator for varying the damping force provided by the shock absorber; a sensor for outputting a sensor signal which depends on a relative position between the spring upper member and the spring lower member; detecting means for detecting a condition of the actuator; estimating means for estimating an absolute speed of the spring upper member in response to the sensor signal and the actuator condition detected by the detecting means; and control means for controlling the actuator in response to the absolute spring upper member speed estimated by the estimating means.

DESCRIPTION OF THE FIRST PREFERRED EMBODIMENT

A description will now be given of the essence of a shock absorber control apparatus according to a first embodiment of this invention. A suspension includes a combination of a spring and a shock absorber connected between a vehicle body and a vehicle wheel. The shock absorber provides a variable damping force. The damping force provided by the shock absorber is controlled in response to an estimated value of the absolute speed of a spring upper member.

Specifically, the equation (1) is subjected to Laplace transform, and consequently an estimated value DXp of the absolute speed of the spring upper member is given as:

$$DXp = -c \cdot Y/M - k \cdot Y/S \cdot M \qquad (4)$$

The equation (4) contains the four variable parameters "c", "M", "k", and "Y". Since the ranges of variations of the spring upper member weight "M" and the spring modulus "k" of the spring are relatively narrow, the estimated value DXp of the absolute speed of the spring upper member is reliable and accurate even when the parameters "M" and "k" are regarded as respective fixed values. Thus, the spring upper member weight "M" and the spring modulus "k" of the suspension spring are considered to be equal to predetermined fixed values respectively. The relative displacement "Y" between the spring upper member and the spring lower member is detected by a sensor. An accurate estimation is given of the damping factor "c" of the shock absorber. In this way, the values of the parameters "c", "M", "k", and "Y" are determined. The determined values of the parameters "c", "M", "k", and "Y" are placed into the equation (4) so that the estimated value DXp of the absolute speed of the spring upper member is calculated according to the equation (4).

Figure 1:
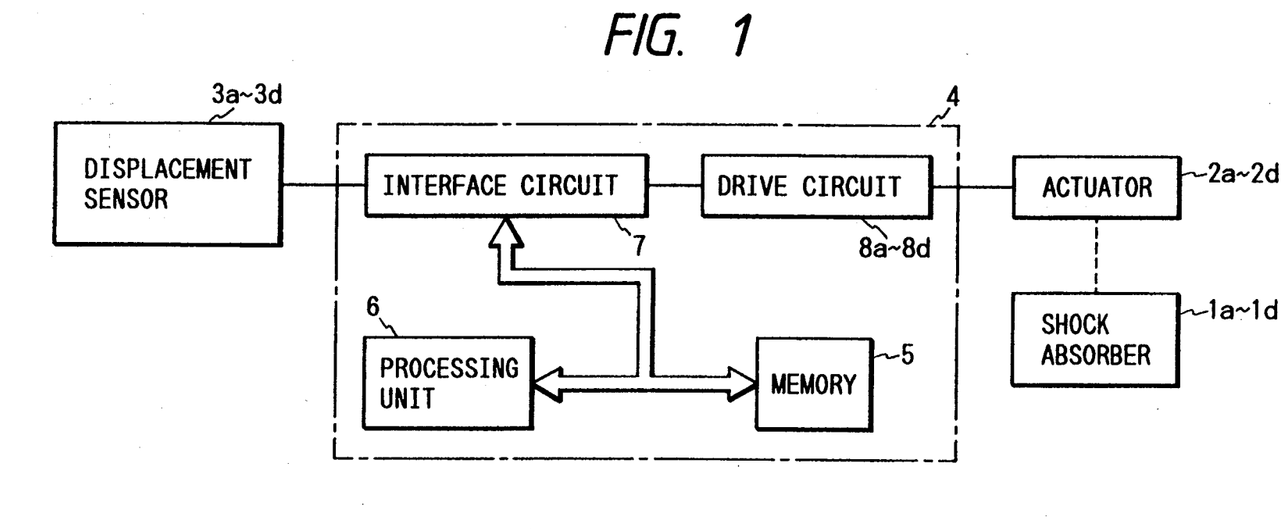
FIG. 1 is a block diagram of a shock absorber control apparatus according to a first embodiment of this invention.

The shock absorber control apparatus according to the first embodiment of this invention will be further described. With reference to FIG. 1, shock absorbers $1a-1d$ connected between a vehicle body (not shown) and vehicle wheels (not shown) are of the known type which provides a variable damping force. The shock absorber control apparatus includes actuators $2a-2d$ connected to the shock absorbers $1a-1d$. The actuators $2a-2d$ serve to adjust the damping forces provided by the shock absorbers $1a-1d$ respectively. The actuators $2a-2d$ include suitable devices, such as stepping motors or torque motors, for driving shock-absorber controlling valves.

The shock absorber control apparatus also includes sensors $3a-3d$ which detect relative displacements between spring upper members (not shown) and spring lower members (not shown), that is, relative displacements between the tops and the bottoms of the springs. The shock absorber control apparatus further includes a controller 4 connected between the displacement sensors $3a-3d$ and the actuators $2a-2d$. The controller 4 generates drive signals in response to the output signals of the displacement sensors $3a-3d$, and outputs the drive signals to the actuators $2a-2d$ to control the actuators $2a-2d$. The control of the actuators $2a-2d$ results in the adjustment of the damping forces provided by the shock absorbers $1a-1d$.

The controller 4 includes a microcomputer or a similar device which has a combination of a memory 5, a processing unit 6, an interface circuit 7, and drive circuits $8a-8d$. The memory 5 includes a ROM and a RAM. The controller 4 operates in accordance with a program stored in the ROM.

Figure 2:
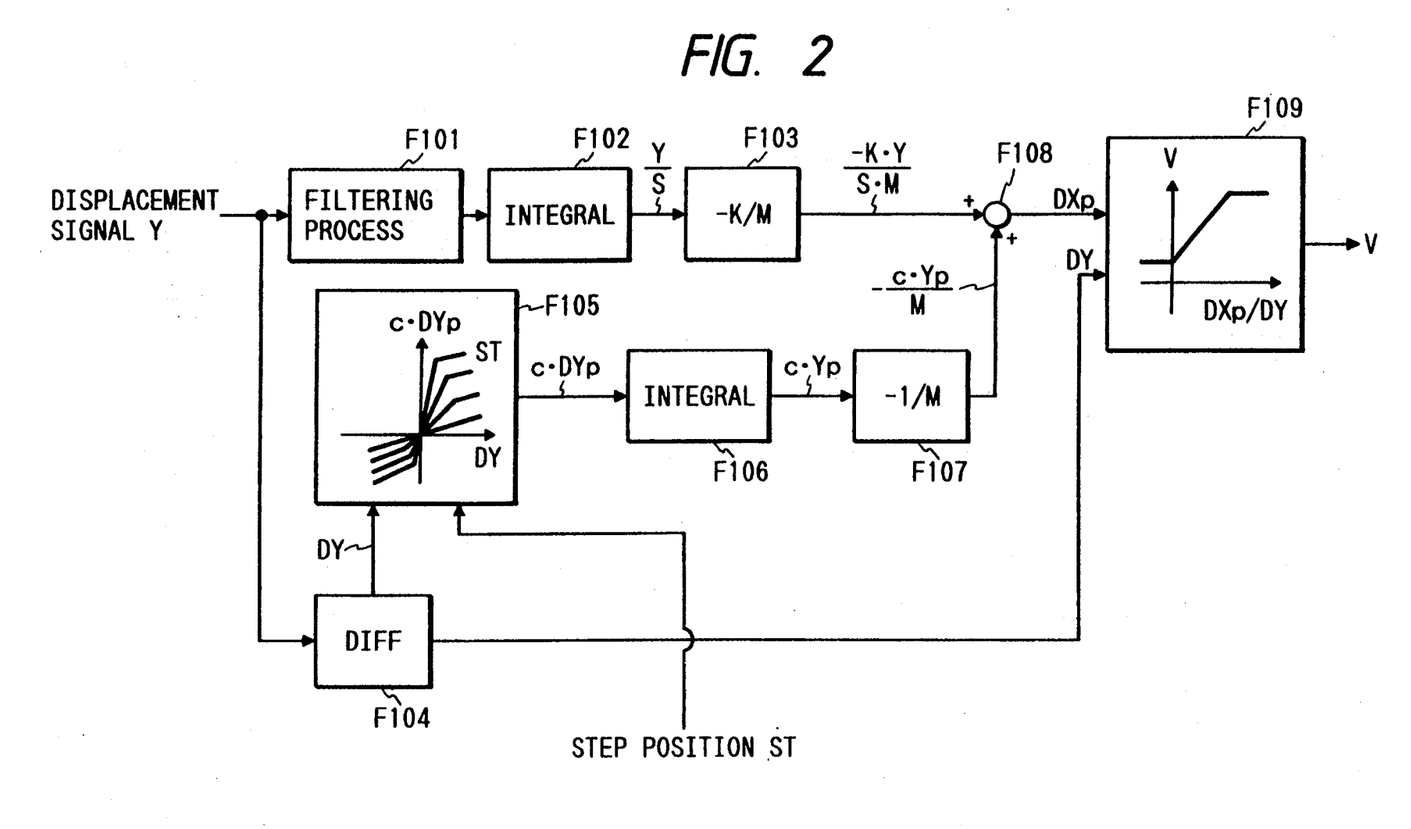
FIG. 2 is a diagram of the flow of operation of a controller in the first embodiment.

The controller 4 operates as follows. With reference to FIG. 2, an operation block F101 executes a process of filtering the output signal "Y" of the displacement sensor $3a$ which represents the relative displacement between the spring upper member and the spring lower member. The filtering process is designed to remove an offset component from the displacement signal "Y" which is caused by an additional weight of the vehicle body side. Those skilled in the art will readily appreciate that removing an offset component from the displacement signal is accomplished by high-pass filtering.

An operation block F102 following the operation block F101 executes a process of integrating the filtered displacement signal "Y", and thereby generates a signal representing the value Y/S where "S" denotes the Laplace operator. An operation block F103 subsequent to the operation block F102 multiplies the value Y/S by a predetermined gain $-k/M$, and thereby generates a signal representing the value $-k \cdot Y/S \cdot M$ where "k" denotes a predetermined value of a spring modulus and "M" denotes a predetermined value of a spring upper member weight.

An operation block F104 executes a process of differentiating the displacement signal "Y", and thereby generates a signal representing the relative speed DY between the spring upper member and the spring lower member.

An operation block F105 following the operation block F104 estimates a damping force $c \cdot DYp$ in accordance with the spring upper-lower relative speed DY and the degree of opening of the shock-absorber controlling valve. The degree of opening of the shock-absorber controlling valve is an operating condition of the actuator $2a$. The degree of opening of the shock-absorber controlling valve can be a step position ST which corresponds to the current position or the previous position of the movable part of the actuator $2a$, that is, the current step position or the previous step position of the stepping motor. The step position ST is represented by a signal stored in the memory 5. Specifically, the memory 5 holds a preset map determining a relation among the estimated value of the damping force $c \cdot DYp$, the value of the spring upper-lower relative speed DY, and the value of the step position ST. The damping force $c \cdot DYp$ is estimated in response to the spring upper-lower relative speed DY and the step position ST by referring to the map. It should be noted that the map may be replaced by a predetermined equation.

An operation block F106 following the operation block F105 executes a process of integrating the estimated damping force c·DYp, and thereby generates a signal representing the value c·Yp. An operation block F107 subsequent to the operation block F106 multiplies the value c·Yp by a predetermined gain −1/M, and thereby generates a signal representing the value −c·Yp/M.

An operation block F108 following the operation blocks F103 and F107 adds the value −k·Y/S·M and the value −c·Yp/M, and thereby calculates the estimated value DXp of the absolute speed of the spring upper member according to the equation (4). The operation block F108 generates a signal representing the calculated estimated value DXp of the absolute speed of the spring upper member.

An operation block F109 following the operation block F108 is informed of the estimated value DXp of the absolute speed of the spring upper member. In addition, the operation block F109 is informed of the spring upper-lower relative speed DY by the operation block F104. The operation block F109 determines a target value "V" of the position of the movable part of the actuator 2a in accordance with the estimated value DXp of the absolute speed of the spring upper member and the spring upper-lower relative speed DY. Specifically, the estimated value DXp of the absolute speed of the spring upper member is divided by the spring upper-lower relative speed DY so that the value DXp/DY is calculated. The memory 5 holds a preset map determining a relation between the target value "V" and the value DXp/DY. The target value "V" is determined in response to the value DXp/DY by referring to the map. It should be noted that the map may be replaced by a predetermined equation. The operation block F109 generates a drive signal in response to the determined target value "V", and outputs the drive signal to the actuator 2a.

Thus, the actuator 2a is driven in accordance with the target value "V" so that the damping force provided by the shock absorber 1a is adjusted in response to the output signal of the displacement sensor 3a which represents the relative displacement "Y" between the spring upper member and the spring lower member.

The previously-mentioned sequence of the operation blocks F101–F109 is reiteratively and cyclically executed. A target value "V" which is given in one execution cycle will be used as an indication of a step position ST in an immediately following execution cycle or a second following execution cycle.

Similarly, the controller 4 generates drive signals for the actuators 2b–2d in response to the output signals of the displacement sensors 3b–3d.

Figure 3:
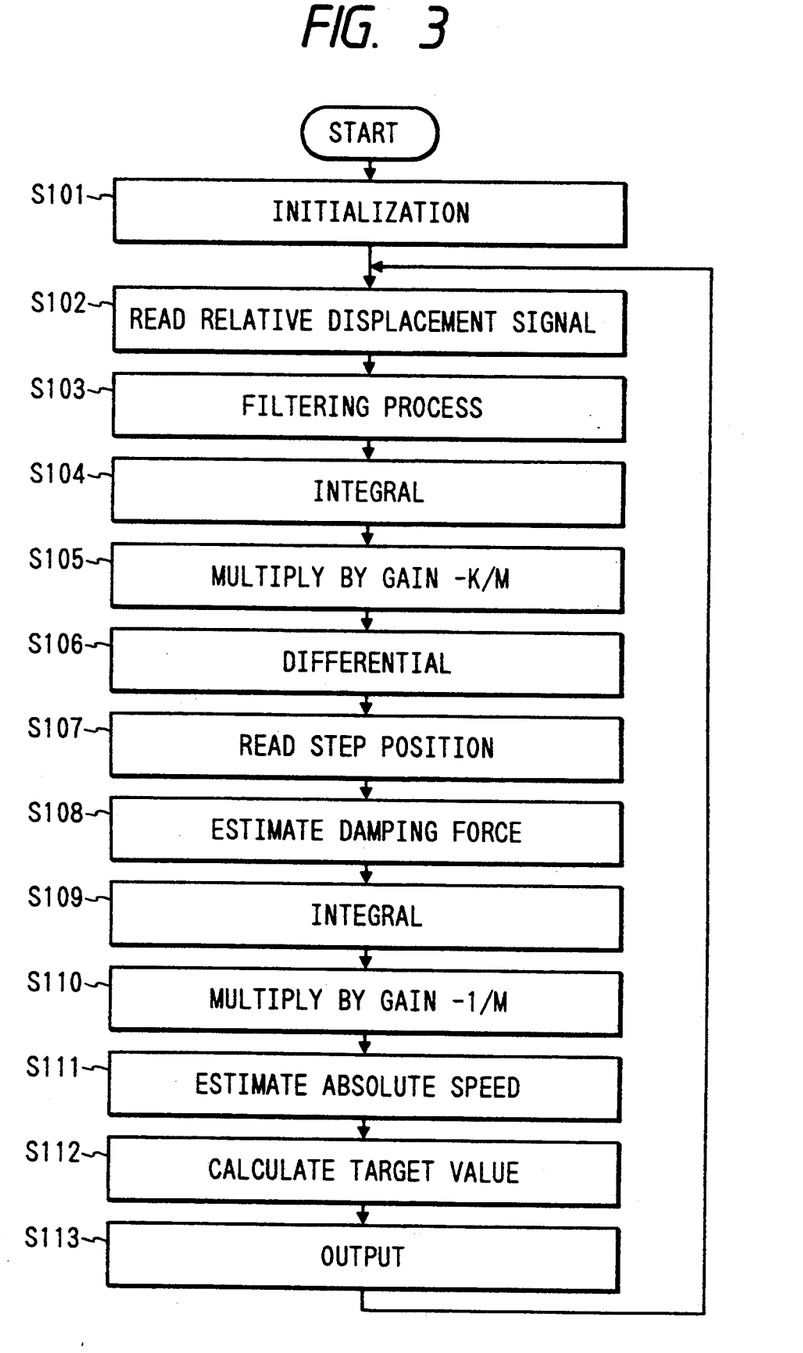
FIG. 3 is a flowchart of a segment of a program for operation of the controller in the first embodiment.

As previously described, the controller 4 operates in accordance with a program. FIG. 3 is a flowchart of a segment of the program. As shown in FIG. 3, a first step S101 of the program segment initializes variables used in later steps. After the step S101, the program advances to a step S102. The step S102 derives the current value "Y" of the relative displacement between the spring upper member and the spring lower member from the output signal of the displacement sensor 3a.

A step S103 following the step S102 executes a process of filtering the current relative displacement "Y" between the spring upper member and the spring lower member. The filtering step S103 corresponds to the operation block F101 of FIG. 2.

A step S104 subsequent to the step S103 executes a process of integrating the filtered relative displacement "Y", and thereby generates data representing the value Y/S where "S" denotes the Laplace operator. The integrating step S104 corresponds to the operation block F102 of FIG. 2. A step S105 subsequent to the step S104 multiplies the value Y/S by the predetermined gain −k/M, and thereby generates data representing the value −k·Y/S·M. The multiplying step S105 corresponds to the operation block F103 of FIG. 2.

A step S106 following the step S105 executes a process of differentiating the current relative displacement "Y", and thereby generates data representing the relative speed DY between the spring upper member and the spring lower member. The differentiating step S106 corresponds to the operation block F104 of FIG. 2. A step S107 subsequent to the step S106 reads out data of the step position ST from the memory 5 (see FIG. 1).

A step S108 following the step S107 estimates a damping force c·DYp in accordance with the spring upper-lower relative speed DY and the step position ST. The estimating step S108 corresponds to the operation block F105 of FIG. 2.

A step S109 subsequent to the step S108 executes a process of integrating the estimated damping force c·DYp, and thereby generates data representing the value c·Yp. The integrating step S109 corresponds to the operation block F106 of FIG. 2. A step S110 following the step S109 multiplies the value c·Yp by the predetermined gain −1/M, and thereby generates data representing the value −c·Yp/M. The multiplying step S110 corresponds to the operation block F107 of FIG. 2.

A step S111 following the step S110 adds the value −k·Y/S·M and the value −c·Yp/M, and thereby calculates the estimated value DXp of the absolute speed of the spring upper member according to the equation (4). The step S111 generates data representing the calculated estimated value DXp of the absolute speed of the spring upper member. The adding step S111 corresponds to the operation block F108 of FIG. 2.

A step S112 following the step S111 determines a target value "V" of the position of the movable part of the actuator 2a in accordance with the estimated value DXp of the absolute speed of the spring upper member and the spring upper-lower relative speed DY. A step S113 subsequent to the step S112 generates a drive signal in response to the determined target value "V", and outputs the drive signal to the actuator 2a. The steps S112 and S113 correspond to the operation block F109 of FIG. 2.

After the step S113, the program returns to the step S102 so that the sequence of the steps S102–S113 is reiteratively and cyclically executed. A target value "V" which is given in one execution cycle will be used as an indication of a step position ST in an immediately following execution cycle or a second following execution cycle.

The program has segments similar to the program segment of FIG. 3 which are designed to generate drive signals for the actuators 2b–2d in response to the output signals of the displacement sensors 3b–3d.

DESCRIPTION OF THE SECOND PREFERRED EMBODIMENT

Figure 4:
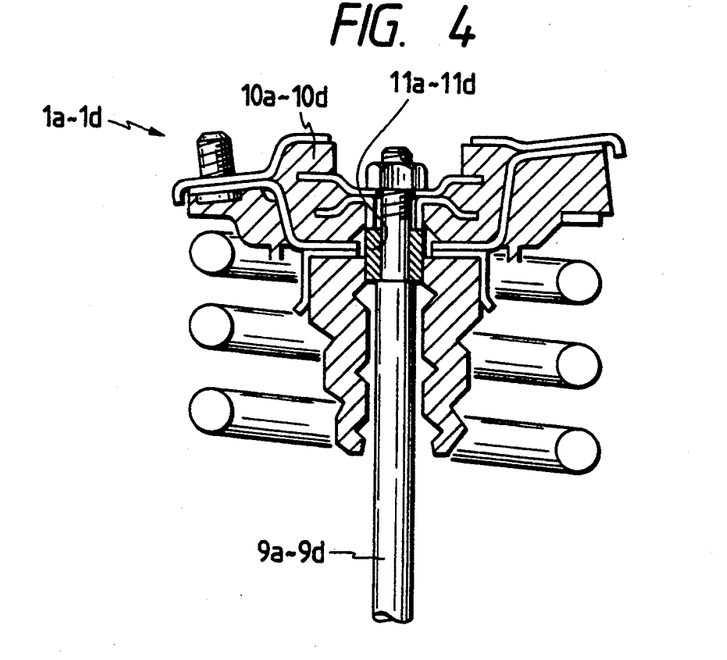
FIG. 4 is a sectional view of a part of a suspension in a second embodiment of this invention.

A second embodiment of this invention is similar to the embodiment of FIGS. 1–3 except for design changes indicated hereinafter. With reference to FIG. 4, the second embodiment includes acceleration sensors which have piezoelectric elements 11a–11d provided between piston rods 9a–9d and upper supports 10a–10d of shock absorbers 1a–1d. The piezoelectric elements 11a–11d generate and output signals representing the differentials c·DDY of the damping forces provided by the shock absorbers 1a–1d. A controller 4 (see FIG. 1) receives the output signals of the piezoelectric elements 11a–11d, and generates drive signals for actuators 2a–2d (see FIG. 1) in response to the output signals of the piezoelectric elements 11a–11d.

Figure 5:
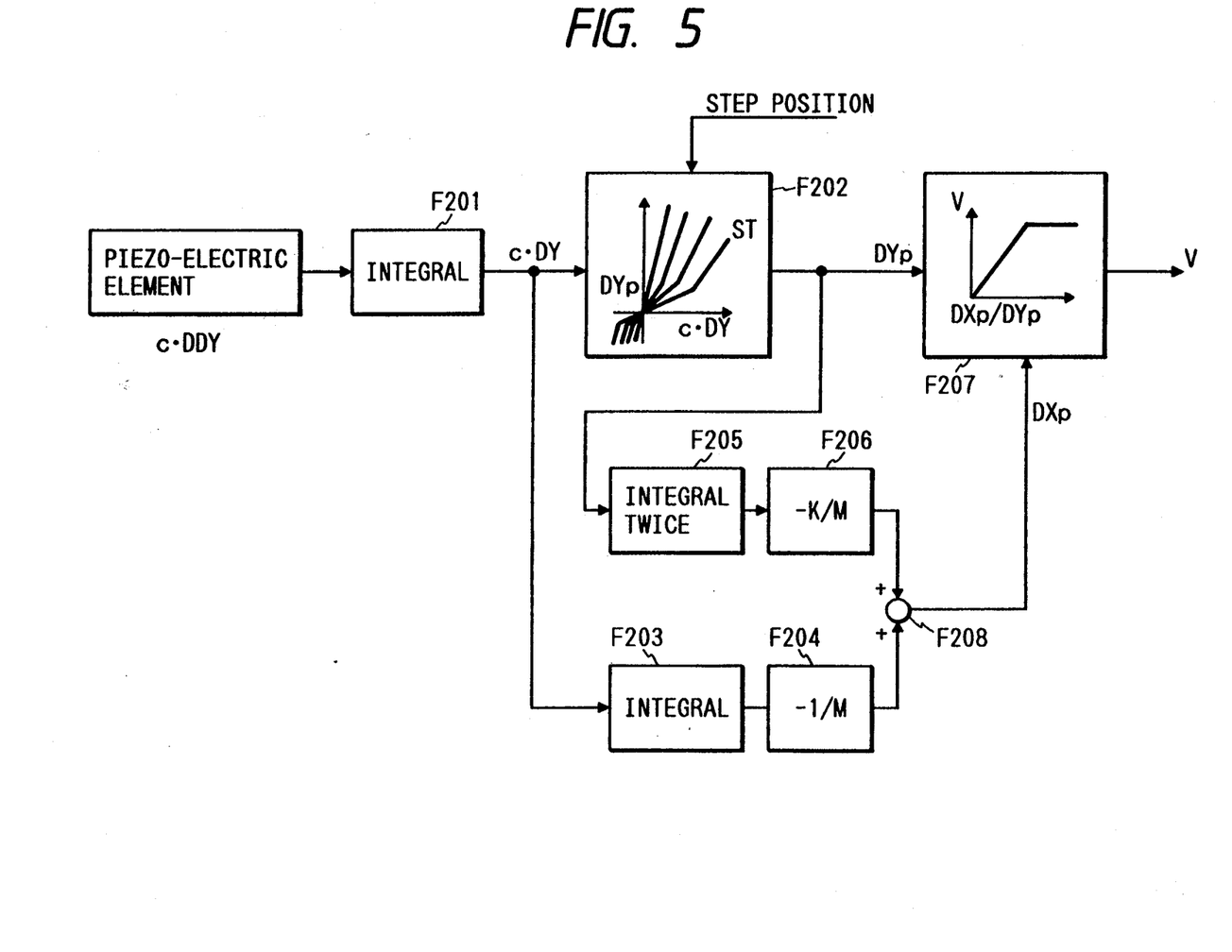
FIG. 5 is a diagram of the flow of operation of a controller in the second embodiment.

The controller 4 in the second embodiment operates as follows. With reference to FIG. 5, an operation block F201 executes a process of integrating the output signal c·DDY of the sensor 3a which represents the differential of the damping force. As a result of the integrating process, the operation block F201 generates a signal representing the damping force c·DY. It should be noted that "c" denotes the damping factor of the shock absorber, and DY denotes the relative speed between the spring upper member and the spring lower member.

An operation block F202 following the operation block F201 calculates an estimated value DYp of the relative speed between the spring upper member and the spring lower member from the damping force c·DY and the degree of opening of the shock-absorber controlling valve. The degree of opening of the shock-absorber controlling valve is an operating condition of the actuator 2a (see FIG. 1). The degree of opening of the shock-absorber controlling valve can be a step position ST which corresponds to the current position or the previous position of the movable part of the actuator 2a, that is, the current step position or the previous step position of the stepping motor. The step position ST is represented by a signal stored in a memory 5 (see FIG. 1). Specifically, the memory 5 holds a preset map determining a relation among the estimated value of the relative speed DYp between the spring upper member and the spring lower member, the value of the damping force c·DY, and the value of the step position ST. The spring upper-lower relative speed DYp is estimated in response to the damping force c·DY and the step position ST by referring to the map. It should be noted that the map may be replaced by a predetermined equation. The operation block F202 generates a signal representing the estimated spring upper-lower relative speed DYp.

An operation block F203 following the operation block F201 executes a process of integrating the damping force signal c·DY, and thereby generates a signal representing the value c·Y. An operation block F204 subsequent to the operation block F203 multiplies the value c·Y by a predetermined gain $-1/M$, and thereby generates a signal representing the value $-c \cdot Y/M$ where "M" denotes a predetermined value of a spring upper member weight.

An operation block F205 following the operation block F202 executes a process of integrating the estimated spring upper-lower relative speed DYp twice, and thereby generates a signal representing the value Yp/S where "S" denotes the Laplace operator. An operation block F206 subsequent to the operation block F205 multiplies the value Yp/S by a predetermined gain $-k/M$, and thereby generates a signal representing the value $-k \cdot Yp/S \cdot M$ where "k" denotes a predetermined value of a spring modulus.

An operation block F208 following the operation blocks F204 and F206 adds the value $-c \cdot Y/M$ and the value $-k \cdot Yp/S \cdot M$, and thereby calculates the estimated value DXp of the absolute speed of the spring upper member according to the equation (4). The operation block F208 generates a signal representing the calculated estimated value DXp of the absolute speed of the spring upper member.

An operation block F207 following the operation block F208 is informed of the estimated value DXp of the absolute speed of the spring upper member. In addition, the operation block F207 is informed of the estimated spring upper-lower relative speed DYp by the operation block F202. The operation block F207 determines a target value "V" of the position of the movable part of the actuator 2a in accordance with the estimated value DXp of the absolute speed of the spring upper member and the estimated spring upper-lower relative speed DYp. Specifically, the estimated value DXp of the absolute speed of the spring upper member is divided by the estimated spring upper-lower relative speed DYp so that the value DXp/DYp is calculated. The memory 5 holds a preset map determining a relation between the target value "V" and the value DXp/DYp. The target value "V" is determined in response to the value DXp/DYp by referring to the map. It should be noted that the map may be replaced by a predetermined equation. The operation block F207 generates a drive signal in response to the determined target value "V", and outputs the drive signal to the actuator 2a.

Thus, the actuator 2a is driven in accordance with the target value "V" so that the damping force provided by the shock absorber 1a is adjusted in response to the output signal of the piezoelectric element 11a which represents the differential c·DDY of the damping force provided by the shock absorber 1a.

The previously-mentioned sequence of the operation blocks F201–F208 is reiteratively and cyclically executed. A target value "V" which is given in one execution cycle will be used as an indication of a step position ST in an immediately following execution cycle or a second following execution cycle.

Similarly, the controller 4 generates drive signals for the actuators 2b–2d in response to the output signals of the piezoelectric elements 11b–11d.

Figure 6:
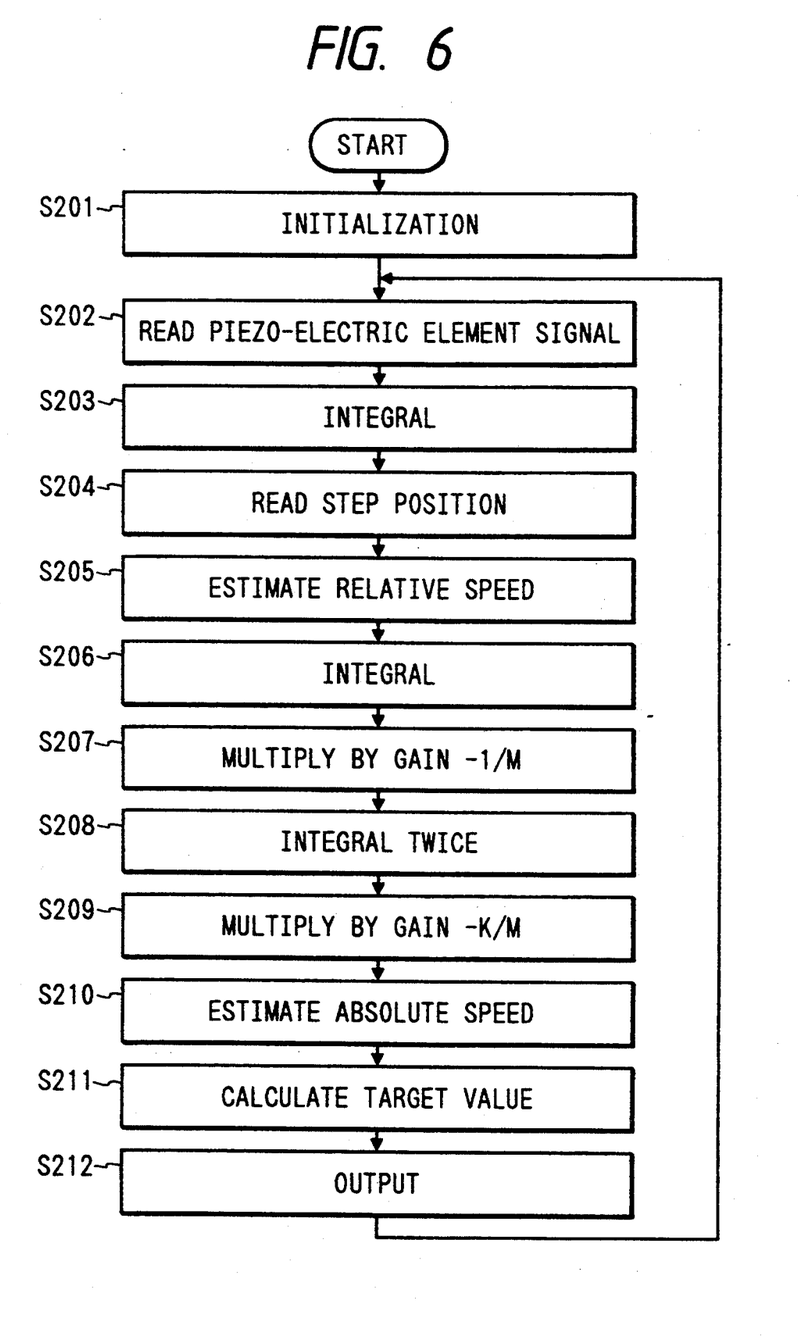
FIG. 6 is a flowchart of a segment of a program for operation of the controller in the second embodiment.

FIG. 6 is a flowchart of a program segment for operation of the controller 4. As shown in FIG. 6, a first step S201 of the program segment initializes variables used in later steps. After the step S201, the program advances to a step S202. The step S102 derives the current value of the differential c·DDY of the shock-absorber damping force from the output signal of the piezoelectric element 11a.

A step S203 following the step S202 executes a process of integrating the differential c·DDY of the shock-absorber damping force, and thereby generates data representing the damping force c·DY. The integrating step S203 corresponds to the operation block F201 of FIG. 5.

A step S204 subsequent to the step S203 reads out data of the step position ST from the memory 5 (see FIG. 1). A step S205 following the step S204 estimates the relative speed DYp between the spring upper member and the spring lower member in accordance with the damping force c·DY and the step position ST. The estimating step S205 corresponds to the operation block F202 of FIG. 5.

A step S206 following the step S205 executes a process of integrating the damping force c·DY, and thereby generates data representing the value c·Y. The integrating step S206 corresponds to the operation block F203 of FIG. 5. A step S207 subsequent to the step S206 multiplies the value c·Y by a predetermined gain $-1/M$, and thereby generates data representing the value $-c \cdot Y/M$. The multiplying step S207 corresponds to the operation block F204 of FIG. 5.

A step S208 following the step S207 executes a process of integrating the estimated spring upper-lower relative speed DYp twice, and thereby generates data representing the value Yp/S where "S" denotes the Laplace operator. The integrating step S208 corresponds to the operation block F205 of FIG. 5. A step S209 following the step S208 multiplies the value Yp/S by the predetermined gain $-k/M$, and thereby generates data representing the value $-k \cdot Yp/S \cdot M$. The multiplying step S209 corresponds to the operation block F206 of FIG. 5.

A step S210 following the step S209 adds the value $-c \cdot Y/M$ and the value $-k \cdot Yp/S \cdot M$, and thereby calculates the estimated value DXp of the absolute speed of the spring upper member according to the equation (4). The step S210 generates data representing the calculated estimated value DXp of the absolute speed of the spring upper member. The adding step S210 corresponds to the operation block F208 of FIG. 5.

A step S211 following the step S210 determines a target value "V" of the position of the movable part of the actuator 2a in accordance with the estimated value DXp of the absolute speed of the spring upper member and the estimated spring upper-lower relative speed DYp. A step S212 subsequent to the step S211 generates a drive signal in response to the determined target value "V", and outputs the drive signal to the actuator 2a. The steps S211 and S212 correspond to the operation block F207 of FIG. 5.

After the step S212, the program returns to the step S202 so that the sequence of the steps S202–S212 is reiteratively and cyclically executed. A target value "V" which is given in one execution cycle will be used as an indication of a step position ST in an immediately following execution cycle or a second following execution cycle.

The program has segments similar to the program segment of FIG. 6 which are designed to generate drive signals for the actuators 2b–2d in response to the output signals of the piezoelectric elements 11b–11d.

DESCRIPTION OF THE THIRD PREFERRED EMBODIMENT

Figure 7:
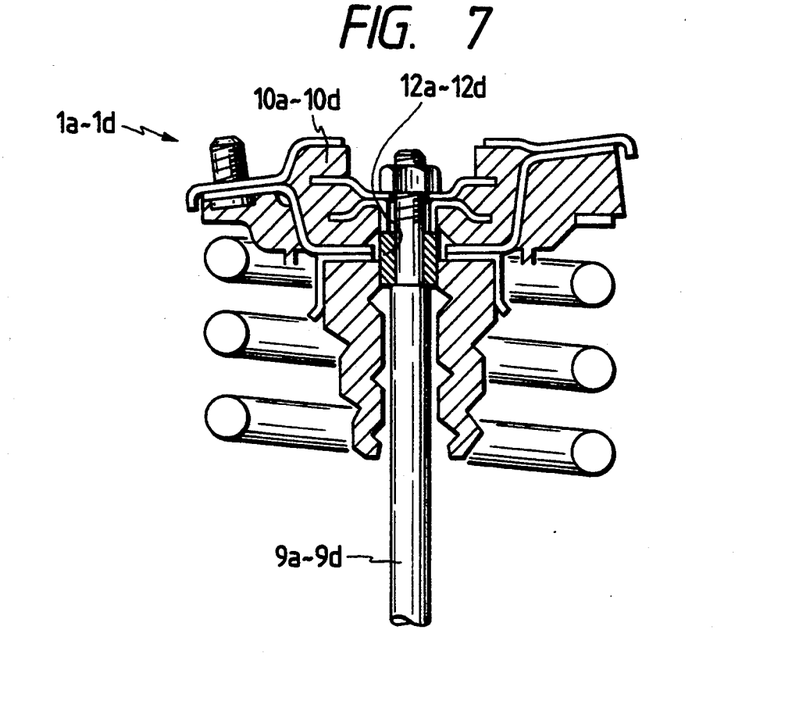
FIG. 7 is a sectional view of a part of a suspension in a third embodiment of this invention.

A third embodiment of this invention is similar to the embodiment of FIGS. 4–6 except for design changes indicated hereinafter. With reference to FIG. 7, the third embodiment includes load sensors 12a–12d provided between piston rods 9a–9d and upper supports 10a–10d of shock absorbers 1a–1d. The load sensors 12a–12d generate and output signals representing the damping forces c·DY provided by the shock absorbers 1a–1d. A controller 4 (see FIG. 1) receives the output signals of the load sensors 12a–12d, and generates drive signals for actuators 2a–2d (see FIG. 1) in response to the output signals of the load sensors 12a–12d.

In the third embodiment, the integrating block F201 (see FIG. 5) is omitted, and the output signals of the load sensors 12a–12d are directly used by the steps F202 and F203 (see FIG. 5).

DESCRIPTION OF THE FOURTH PREFERRED EMBODIMENT

Figure 8:
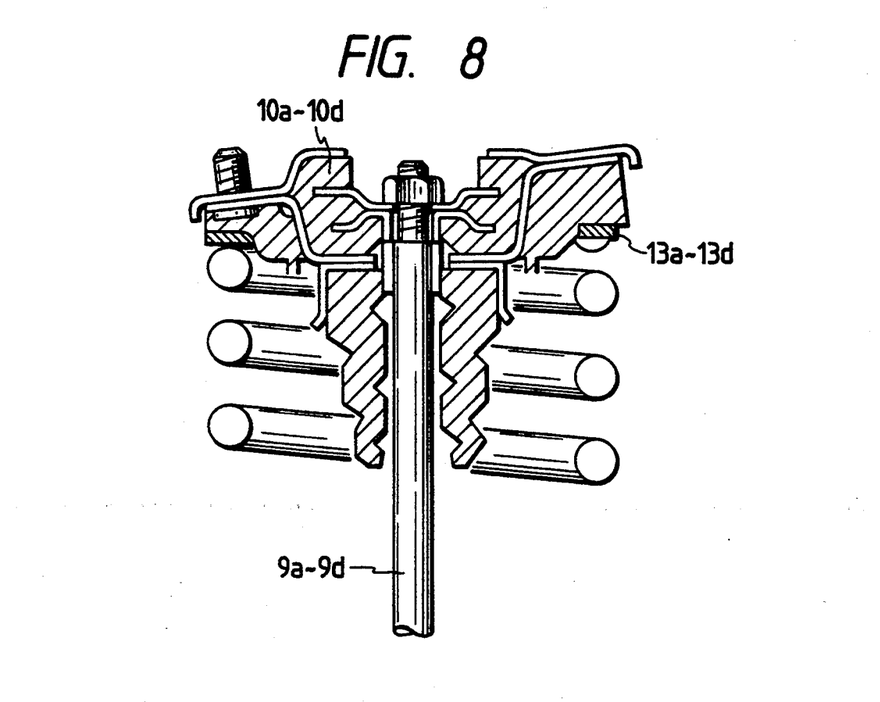
FIG. 8 is a sectional view of a part of a suspension in a fourth embodiment of this invention.

A fourth embodiment of this invention is similar to the embodiment of FIGS. 1–3 except for design changes indicated hereinafter. With reference to FIG. 8, the fourth embodiment includes load sensors 13a–13d provided on seats for suspension springs. Specifically, the load sensors 13a–13d are connected between the tops of the springs and upper supports 10a–10d of shock absorbers. In FIG. 8, the characters 9a–9d denote piston rods. The load sensors 13a–13d generate and output signals representing the forces k·Y provided by the suspension springs. A controller 4 (see FIG. 1) receives the output signals of the load sensors 13a–13d, and generates drive signals for actuators 2a–2d (see FIG. 1) in response to the output signals of the load sensors 13a–13d.

Figure 9:
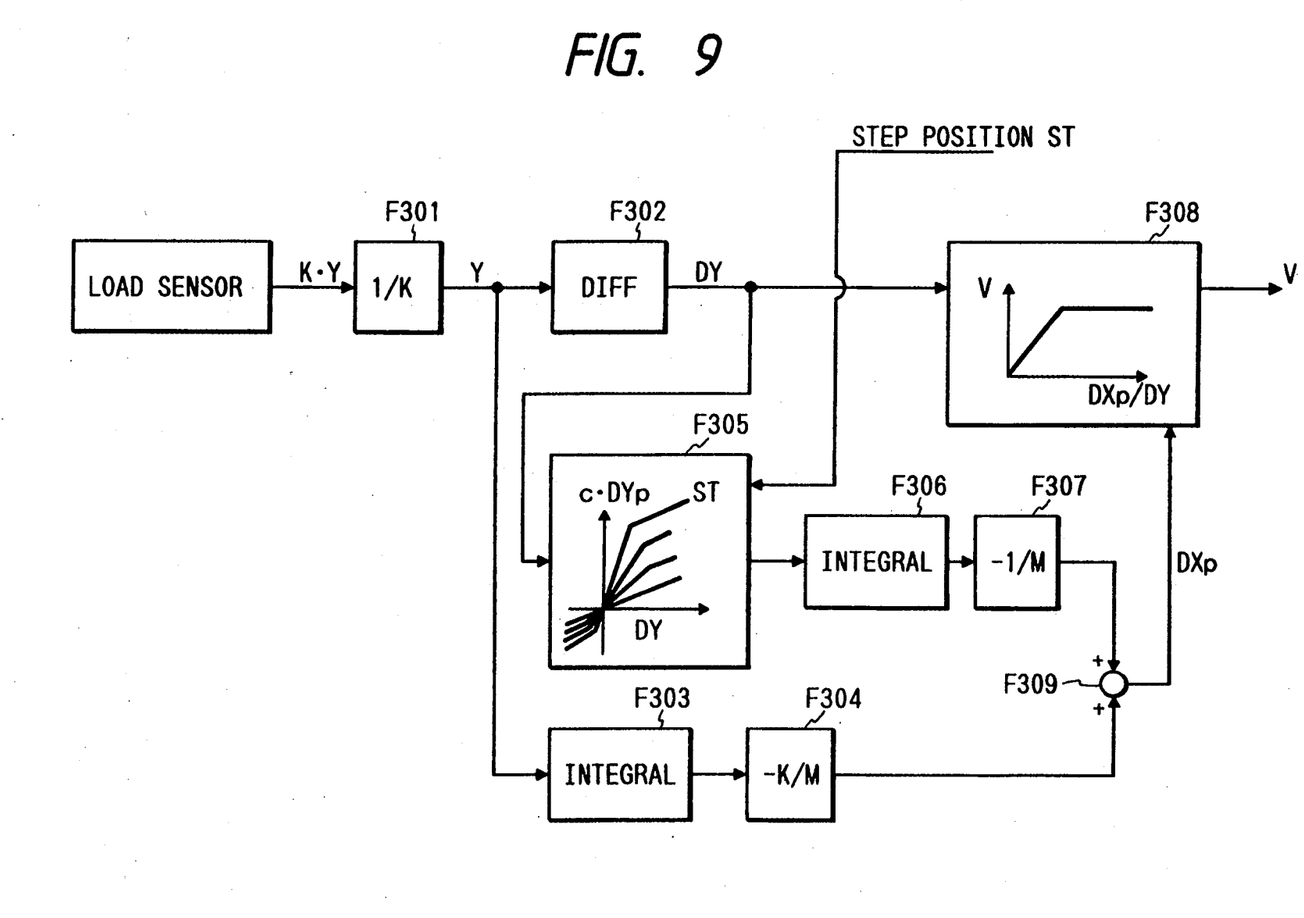
FIG. 9 is a diagram of the flow of operation of a controller in the fourth embodiment.

The controller 4 in the fourth embodiment operates as follows. With reference to FIG. 9, the load sensor 13a informs an operation block F301 of the value of the force k·Y provided by the suspension spring. The operation block F301 multiplies the value k·Y by a predetermined gain 1/k, and thereby generates a signal representing the relative displacement "Y" between a spring upper member and a spring lower member where "k" denotes a predetermined value of a spring modulus.

An operation block F302 following the operation block F301 executes a process of differentiating the displacement signal "Y", and thereby generates a signal representing the relative speed DY between the spring upper member and the spring lower member.

An operation block F305 following the operation block F302 estimates a damping force c·DYp in accordance with the spring upper-lower relative speed DY and the degree of opening of the shock-absorber controlling valve. The degree of opening of the shock-absorber controlling valve is an operating condition of the actuator 2a (see FIG. 1). The degree of opening of the shock-absorber controlling valve can be a step position ST which corresponds to the current position or the previous position of the movable part of the actuator 2a, that is, the current step position or the previous step position of the stepping motor. The step position ST is represented by a signal stored in a memory 5 (see FIG. 1). Specifically, the memory 5 holds a preset map determining a relation among the estimated value of the damping force c·DYp, the value of the spring upper-lower relative speed DY, and the value of the step position ST. The damping force c·DYp is estimated in response to the spring upper-lower relative speed DY and the step position ST by referring to the map. It should be noted that the map may be replaced by a predetermined equation.

An operation block F306 following the operation block F305 executes a process of integrating the estimated damping force c·DYp, and thereby generates a signal representing the value c·Yp. An operation block F307 subsequent to the operation block F306 multiplies the value c·Yp by a predetermined gain $-1/M$, and thereby generates a signal representing the value $-c \cdot Yp/M$ where "M" denotes a predetermined value of a spring upper member weight.

An operation block F303 subsequent to the operation block F301 executes a process of integrating the displacement signal "Y", and thereby generates a signal representing the value Y/S where "S" denotes the Laplace operator. An operation block F304 following the operation block F303 multiplies the value Y/S by a predetermined gain $-k/M$, and thereby generates a signal representing the value $-k \cdot Y/S \cdot M$.

An operation block F309 following the operation blocks F304 and F307 adds the value $-k \cdot Y/S \cdot M$ and the value $-c \cdot Yp/M$, and thereby calculates the estimated value DXp of the absolute speed of the spring upper member according to the equation (4). The operation block F309 generates a signal representing the calculated estimated value DXp of the absolute speed of the spring upper member.

An operation block F308 following the operation block F309 is informed of the estimated value DXp of the absolute speed of the spring upper member. In addition, the operation block F308 is informed of the spring upper-lower relative speed DY by the operation block F302. The operation block F308 determines a target value "V" of the position of the movable part of the actuator 2a in accordance with the estimated value DXp of the absolute speed of the spring upper member and the spring upper-lower relative speed DY. Specifically, the estimated value DXp of the absolute speed of the spring upper member is divided by the spring upper-lower relative speed DY so that the value DXp/DY is calculated. The memory 5 holds a preset map determining a relation between the target value "V" and the value DXp/DY. The target value "V" is determined in response to the value DXp/DY by referring to the map. It should be noted that the map may be replaced by a predetermined equation. The operation block F308 generates a drive signal in response to the determined target value "V", and outputs the drive signal to the actuator 2a.

Thus, the actuator 2a is driven in accordance with the target value "V" so that the damping force provided by the shock absorber 1a is adjusted in response to the output signal of the load sensor 13a which represents the force k·Y provided by the suspension spring.

The previously-mentioned sequence of the operation blocks F301–F309 is reiteratively and cyclically executed. A target value "V" which is given in one execution cycle will be used as an indication of a step position ST in an immediately following execution cycle or a second following execution cycle.

Similarly, the controller 4 generates drive signals for the actuators 2b–2d in response to the output signals of the load sensors 13b–13d.

Figure 10:
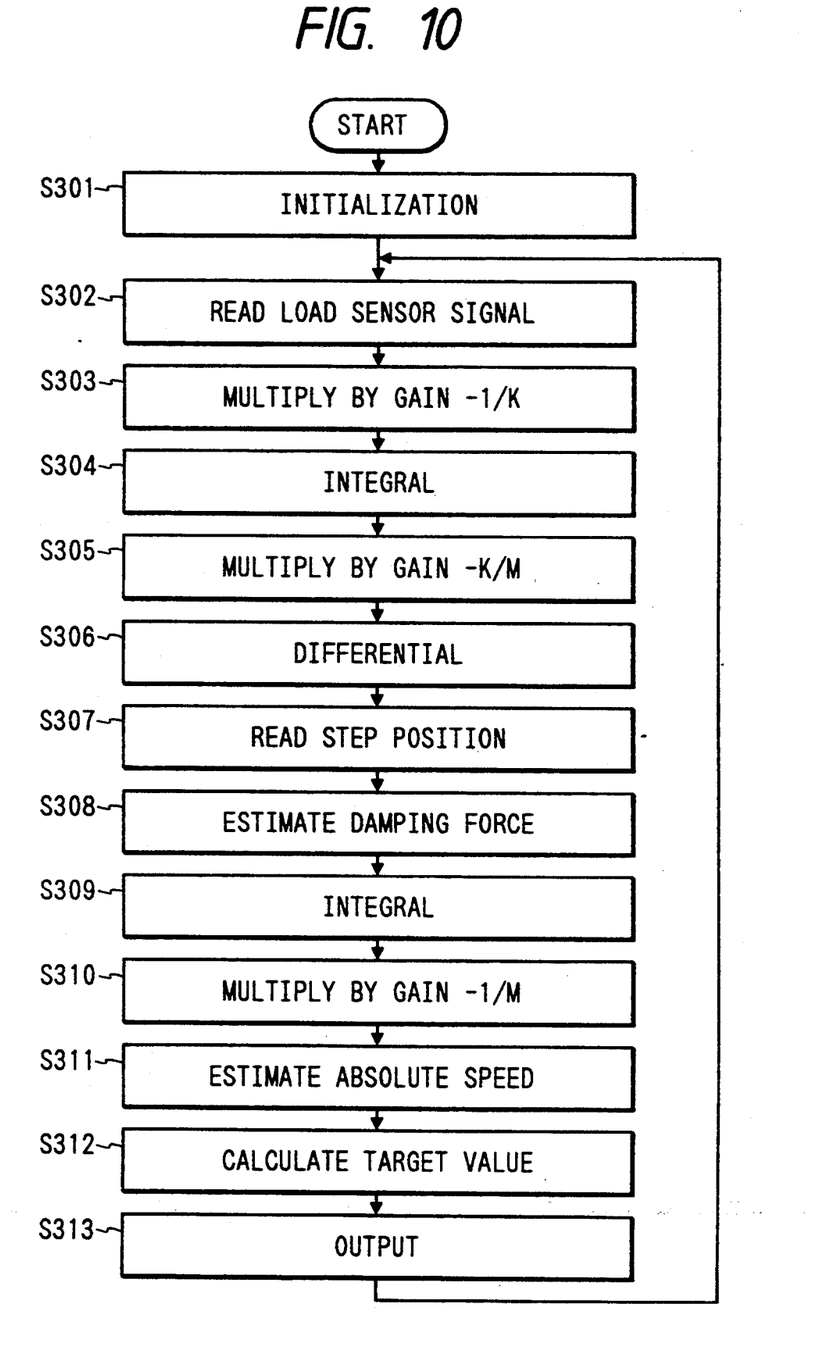
FIG. 10 is a flowchart of a segment of a program for operation of the controller in the fourth embodiment.

FIG. 10 is a flowchart of a program segment for operation of the controller 4. As shown in FIG. 10, a first step S301 of the program segment initializes variables used in later steps. After the step S301, the program advances to a step S302. The step S302 derives the current value of the spring force k·Y by the output signal of the load sensor 13a.

A step S303 following the step S302 multiplies the current spring force value k·Y by a predetermined gain 1/k, and thereby generates data representing the relative displacement "Y" between the spring upper member and the spring lower member where "k" denotes the predetermined value of the spring modulus. The multiplying step S303 corresponds to the operation block F301 of FIG. 9.

A step S304 subsequent to the step S103 executes a process of integrating the relative displacement "Y", and thereby generates data representing the value Y/S where "S" denotes the Laplace operator. The integrating step S304 corresponds to the operation block F303 of FIG. 9. A step S305 subsequent to the step S304 multiplies the value Y/S by the predetermined gain −k/M, and thereby generates data representing the value −k·Y/S·M. The multiplying step S305 corresponds to the operation block F304 of FIG. 9.

A step S306 following the step S305 executes a process of differentiating the relative displacement "Y", and thereby generates data representing the relative speed DY between the spring upper member and the spring lower member. The differentiating step S306 corresponds to the operation block F302 of FIG. 9. A step S307 subsequent to the step S306 reads out data of the step position ST from the memory 5 (see FIG. 1).

A step S308 following the step S307 estimates a damping force c·DYp in accordance with the spring upper-lower relative speed DY and the step position ST. The estimating step S308 corresponds to the operation block F305 of FIG. 9.

A step S309 subsequent to the step S308 executes a process of integrating the estimated damping force c·DYp, and thereby generates data representing the value c·Yp. The integrating step S309 corresponds to the operation block F306 of FIG. 9. A step S310 following the step S309 multiplies the value c·Yp by the predetermined gain −1/M, and thereby generates data representing the value −c·Yp/M. The multiplying step S310 corresponds to the operation block F307 of FIG. 9.

A step S311 following the step S310 adds the value −k·Y/S·M and the value −c·Yp/M, and thereby calculates the estimated value DXp of the absolute speed of the spring upper member according to the equation (4). The step S311 generates data representing the calculated estimated value DXp of the absolute speed of the spring upper member. The adding step S311 corresponds to the operation block F309 of FIG. 9.

A step S312 following the step S111 determines a target value "V" of the position of the movable part of the actuator 2a in accordance with the estimated value DXp of the absolute speed of the spring upper member and the spring upper-lower relative speed DY. A step S313 subsequent to the step S312 generates a drive signal in response to the determined target value "V", and outputs the drive signal to the actuator 2a. The steps S312 and S313 correspond to the operation block F308 of FIG. 9.

After the step S313, the program returns to the step S302 so that the sequence of the steps S302–S313 is reiteratively and cyclically executed. A target value "V" which is given in one execution cycle will be used as an indication of a step position ST in an immediately following execution cycle or a second following execution cycle.

The program has segments similar to the program segment of FIG. 10 which are designed to generate drive signals for the actuators 2b–2d in response to the output signals of the load sensors 13b–13d.

What is claimed is:

1. A control apparatus for a shock absorber connected between a vehicle body and a vehicle wheel, the shock absorber providing a variable damping force, the apparatus comprising:

vibration detecting means for detecting a relative vibration between an upper member of a suspension spring and a lower member of the suspension spring;

damping-factor estimating means for estimating a damping factor of the shock absorber as an indicator of an absolute speed of the upper member of the suspension spring;

speed estimating means for estimating an absolute speed of the upper member of the suspension spring on the basis of the relative vibration detected by the vibration detecting means and the damping factor estimated by the damping-factor estimating means;

signal setting means for setting a drive signal on the basis of the absolute speed of the upper member of the suspension spring estimated by the speed estimating means; and an actuator, responsive to the drive signal, for adjusting the damping force provided by the shock absorber.

2. The control apparatus of claim 1, wherein the damping-factor estimating means comprises calculating means for calculating a relative speed between the upper member of the suspension spring and the lower member of the suspension spring from the relative vibration detected by the vibration detecting means, and means for estimating the damping factor on the basis of the relative speed calculated by the calculating means and a position of the actuator.

3. The control apparatus of claim 2, wherein the vibration detecting means comprises load detecting means for detecting a load on a suspension.

4. The control apparatus of claim 3, wherein the load detecting means comprises a piezoelectric element provided between a piston rod of the shock absorber and an upper support of the suspension.

5. The control apparatus of claim 3, wherein the load detecting means comprises a load sensor provided between a piston rod of the shock absorber and an upper support of the suspension.

6. The control apparatus of claim 3, wherein the load detecting means comprises a load sensor provided between the suspension spring and an upper support of the suspension.

7. The control apparatus of claim 2, wherein the damping-factor estimating means comprises damping-force estimating means for estimating a damping force on the basis of the relative speed calculated by the calculating means, the position of the actuator, and damping-force characteristics, and means for estimating the damping factor from the damping force estimated by the damping-force estimating means.

8. The control apparatus of claim 7, wherein the damping-force estimating means comprises means for estimating the damping force according to a map or an equation of the damping-force characteristics which is based on the relative speed and the position of the actuator.

9. The control apparatus of claim 2, wherein the vibration detecting means comprises means for detecting a relative displacement between the upper member of the suspension spring and the lower member of the suspension spring.

10. The control apparatus of claim 2, further comprising a memory for storing data of the drive signal set by the signal setting means, and wherein the damping-factor estimating means comprises means for detecting the position of the actuator in response to the immediately preceding drive signal data stored in the memory.

11. The control apparatus of claim 2, further comprising a memory for storing data of the drive signal set by the signal setting means, and wherein the damping-factor estimating means comprises means for detecting the position of the actuator in response to the second preceding drive signal data stored in the memory.

12. The control apparatus of claim 1, further comprising speed calculating means for calculating a relative speed between the upper member of the suspension spring and the lower member of the suspension spring, and wherein the signal setting means comprises means for setting the drive signal of the actuator in response to the absolute speed of the upper member of the suspension spring estimated by the speed estimating means and the relative speed calculated by the speed calculating means.

13. The control apparatus of claim 1, wherein the speed estimating means comprises means for estimating the absolute speed of the upper member of the suspension spring according a first equation resulting from Laplace transform of a second equation of motion of a system having one degree of freedom in the shock absorber, wherein said first and second equations are respectively defined as $M \cdot DDX + c \cdot DY + k \cdot Y = 0$ and $DXp = -c \cdot Y/M - k \cdot Y/S \cdot M$, where M denotes an amount of weight supported by the upper member of the suspension spring, DDX denotes the absolute acceleration of the upper member of the suspension spring, c denotes a coefficient of the shock absorber, DY denotes a relative speed between the upper member of the suspension spring and the lower member of the suspension spring, k denotes a spring modulus of the suspension spring, Y denotes a relative displacement between the upper member of the suspension spring and the lower member of the suspension spring, DXp denotes the estimated value of the absolute speed of the upper member of the suspension spring, and S denotes a Laplace operator.

14. The control apparatus of claim 1, wherein the vibration detecting means comprises means for executing a filtering process to remove an offset component of a relative displacement which is caused by a weight of the upper member of the suspension spring.

15. The control apparatus of claim 1, wherein the vibration detecting means comprises means for executing a high-pass filtering process to remove an offset component of a relative displacement which is caused by a weight of the upper member of the suspension spring.

16. The control apparatus of claim 1, wherein the speed estimating means comprises means for estimating the absolute speed of the upper member of the suspension spring according a first predetermined equation resulting from Laplace transform of a second predetermined equation of motion of a system having one degree of freedom in the shock absorber.

17. A control apparatus for a suspension having a combination of a shock absorber and a spring connected between a spring upper member and a spring lower member, the shock absorber providing a variable damping force, the apparatus comprising:

an actuator for varying the damping force provided by the shock absorber;

a sensor for outputting a sensor signal which depends on a relative position between the spring upper member and the spring lower member;

detecting means for detecting an operating condition of the actuator;

estimating means for estimating an absolute speed of the spring upper member in response to the sensor signal and the actuator condition detected by the detecting means; and control means for controlling the actuator in response to the absolute spring upper member speed estimated by the estimating means, thereby varying the damping force provided by the shock absorber.

* * * * *